(12) United States Patent
Kasuga et al.

(10) Patent No.: US 8,894,074 B2
(45) Date of Patent: Nov. 25, 2014

(54) VEHICLE HEIGHT ADJUSTMENT APPARATUS

(71) Applicant: Showa Corporation, Gyoda (JP)

(72) Inventors: Takahiro Kasuga, Haga-gun (JP);
Fumiaki Ishikawa, Haga-gun (JP);
Shunya Senda, Haga-gun (JP)

(73) Assignee: Showa Corporation, Gyoda-Shi (JP)

( * ) Notice: Subject to any disclaimer, the term of this patent is extended or adjusted under 35 U.S.C. 154(b) by 0 days.

(21) Appl. No.: 13/949,388

(22) Filed: Jul. 24, 2013

(65) Prior Publication Data

US 2014/0125017 A1 May 8, 2014

(30) Foreign Application Priority Data

Nov. 7, 2012 (JP) .................. 2012-245761

(51) Int. Cl.
*B62K 25/04* (2006.01)
*B60G 21/00* (2006.01)

(52) U.S. Cl.
CPC ........... *B62K 25/04* (2013.01); *B62K 2025/045* (2013.01); *B60G 21/002* (2013.01)
USPC ........................ 280/5.504; 701/48; 280/5.514

(58) Field of Classification Search
CPC .. B62K 25/04; B62K 2025/045; B60G 21/00; B60G 21/002; B60G 21/02; B60G 21/045

USPC ................. 701/37, 48; 280/5.5, 5.504, 5.514, 280/124.145

See application file for complete search history.

(56) References Cited

U.S. PATENT DOCUMENTS

| 4,616,847 | A * | 10/1986 | Kanai et al. ................. 280/5.504 |
| 7,613,557 | B2 * | 11/2009 | Iyoda .............................. 701/48 |
| 8,135,514 | B2 * | 3/2012 | Kelly et al. ..................... 701/37 |

FOREIGN PATENT DOCUMENTS

JP  08-22680  B2  3/1996

* cited by examiner

*Primary Examiner* — Paul N Dickson
*Assistant Examiner* — Timothy Wilhelm
(74) *Attorney, Agent, or Firm* — Leason Ellis LLP

(57) ABSTRACT

A vehicle height adjustment apparatus, includes: a front wheel side changing unit capable of changing a front wheel side relative position; a rear wheel side changing unit capable of changing a rear wheel side relative position; and a control unit for adjusting a height of the main body of the vehicle by controlling the front wheel side changing unit and the rear wheel side changing unit so as to change the front wheel side relative position and the rear wheel side relative position, in which the control unit controls the front wheel side changing unit and the rear wheel side changing unit in such a manner that a rate of change of the front wheel side relative position and a rate of change of the rear wheel side relative position satisfy a predetermined relationship.

2 Claims, 14 Drawing Sheets

VEHICLE HEIGHT ADJUSTMENT APPARATUS

CROSS-REFERENCE TO RELATED APPLICATIONS

This application is based on and claims priority under 35 U.S.C. 119 from Japanese Patent Application No. 2012-245761 filed on Nov. 7, 2012, the entire content of which is incorporated herein by reference.

BACKGROUND OF THE INVENTION

1. Field of the Invention

The present invention relates to a vehicle height adjustment apparatus.

2. Description of the Related Art

In recent years, an apparatus has been proposed which raises the height of a motorcycle during travel of the motorcycle, and which lowers the height of the motorcycle in order to make it easier to get on and off the motorcycle when stationary.

For example, the vehicle height adjustment apparatus according to Japanese Examined Patent Publication No. H8-22680 changes the vehicle height automatically in response to the speed of a motorcycle, so as to raise the vehicle height automatically when the speed of the motorcycle has reached a set speed and so as to lower the vehicle height automatically when the speed of the motorcycle becomes equal to or lower than the set speed.

SUMMARY OF THE INVENTION

A mechanism can be envisaged in which a vehicle height is adjusted by using both a front wheel side relative position changing unit which can change a relative position of a vehicle main body and a front wheel, and a rear wheel side relative position changing unit which can change a relative position of a vehicle main body and rear wheel. In the case of this mechanism, in order to maintain stability during travel, it is desirable not to change the attitude of the vehicle main body, and in particular, the attitude of the seat.

An illustrative aspect of the present invention is to provide a vehicle height adjustment apparatus which can maintain the attitude of a vehicle main body during the course of vehicle height adjustment.

According to an aspect of the invention, a vehicle height adjustment apparatus, includes: a front wheel side changing unit capable of changing a front wheel side relative position which is a relative position of a main body of a vehicle and a front wheel thereof; a rear wheel side changing unit capable of changing a rear wheel side relative position which is a relative position of the main body of the vehicle and a rear wheel thereof; and a control unit for adjusting a height of the main body of the vehicle by controlling the front wheel side changing unit and the rear wheel side changing unit so as to change the front wheel side relative position and the rear wheel side relative position, in which the control unit controls the front wheel side changing unit and the rear wheel side changing unit in such a manner that a rate of change of the front wheel side relative position and a rate of change of the rear wheel side relative position satisfy a predetermined relationship.

Here, the control unit may start changing of the front wheel side relative position and the rear wheel side relative position when a predetermined condition is established, and controls the front wheel side changing unit and the rear wheel side changing unit in such a manner that a ratio between an amount of change of the front wheel side relative position and an amount of change of the rear wheel side relative position during a prescribed time period after the start of changing becomes a prescribed value.

Furthermore, the control unit may controls the front wheel side changing unit and the rear wheel side changing unit so as to reduce the amount of change of one of the front wheel side relative position and the rear wheel side relative position has a greater rate of change, if the ratio between the amount of change of the front wheel side relative position and the amount of change of the rear wheel side relative position during the prescribed time period after the start of changing is not the prescribed value.

Moreover, the control unit may start changing of the front wheel side relative position and the rear wheel side relative position when a speed of the vehicle has become equal to or greater than a predetermined speed.

With any one of the configurations discussed above, it is possible to maintain the attitude of the vehicle main body, even during the course of adjustment of the vehicle height.

Figure 10:
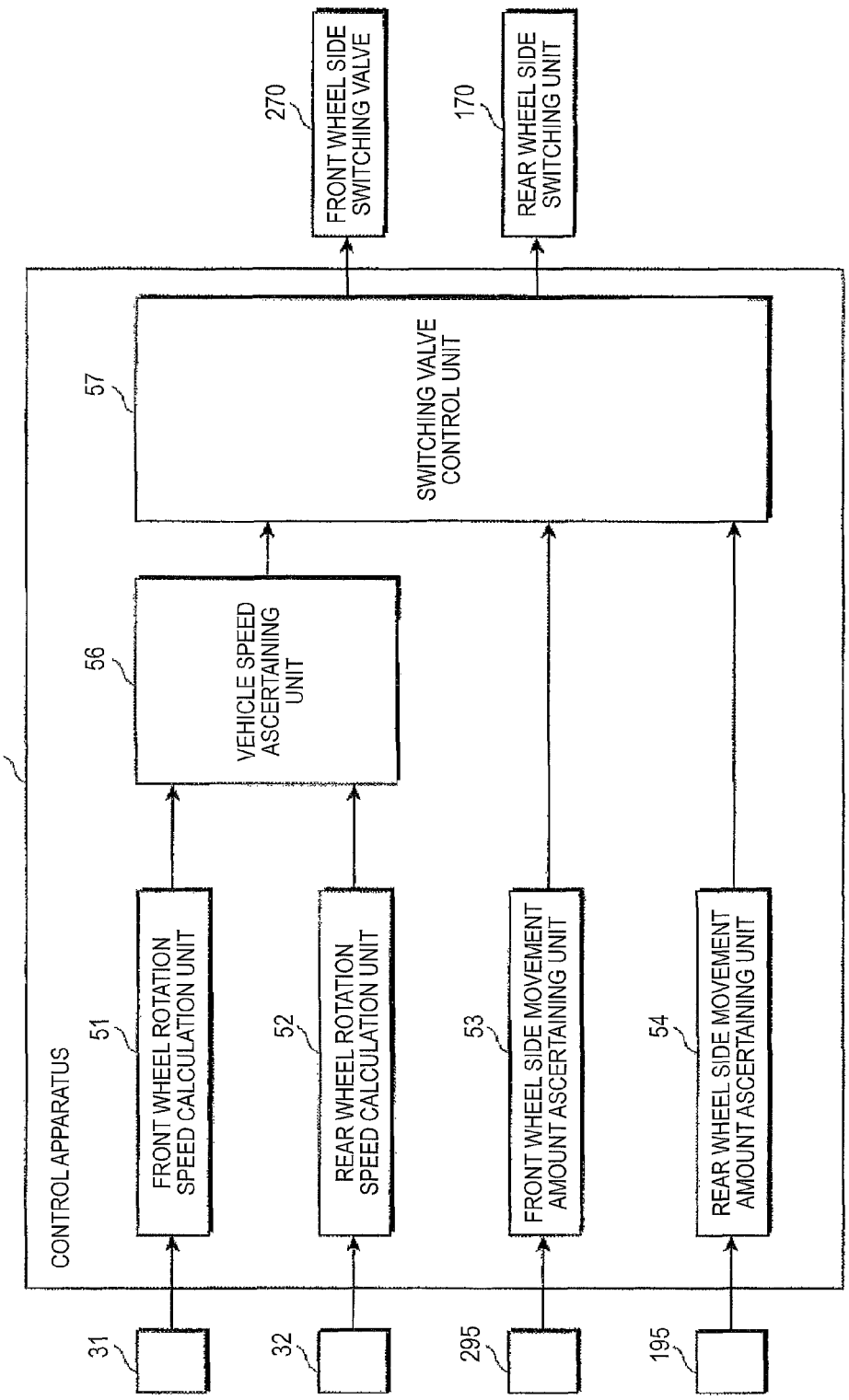
Figure 11:
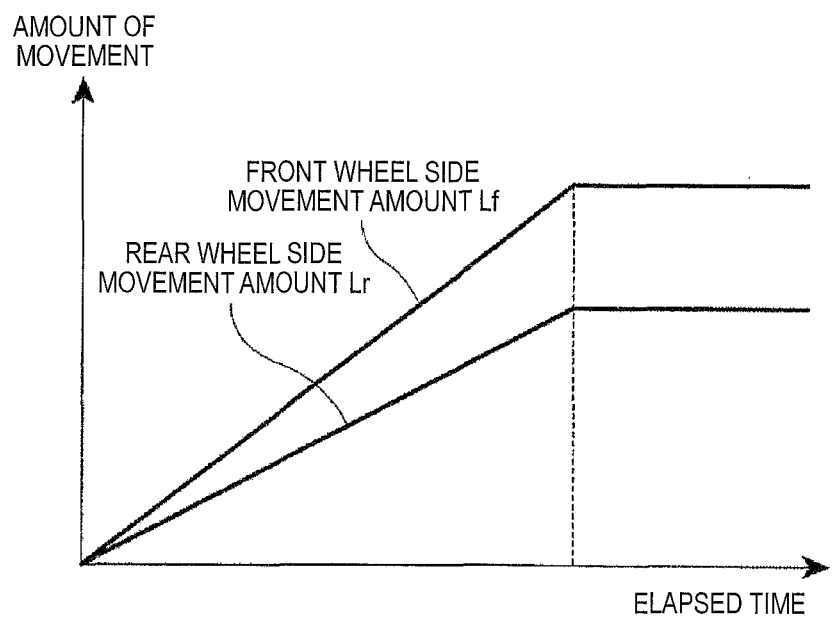
Figure 12:
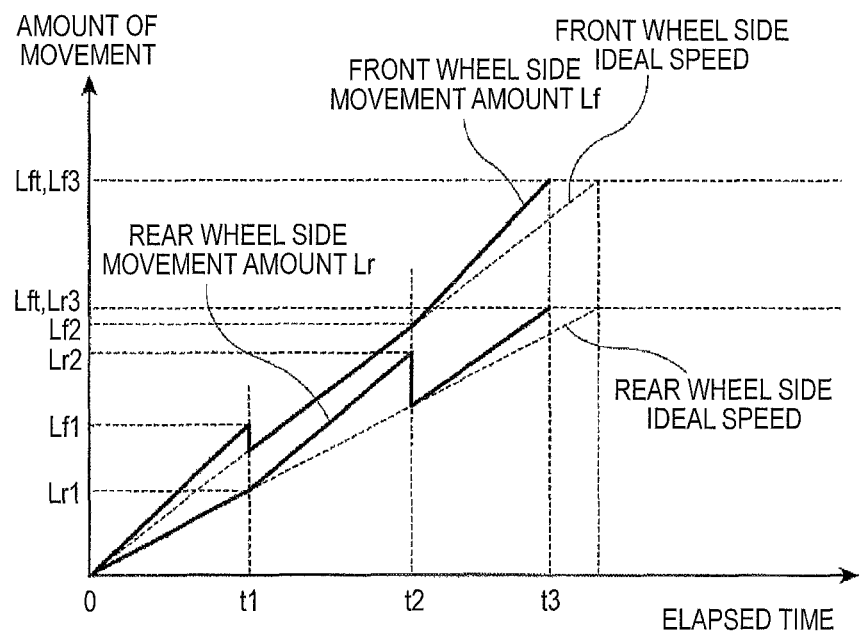
Figure 13:
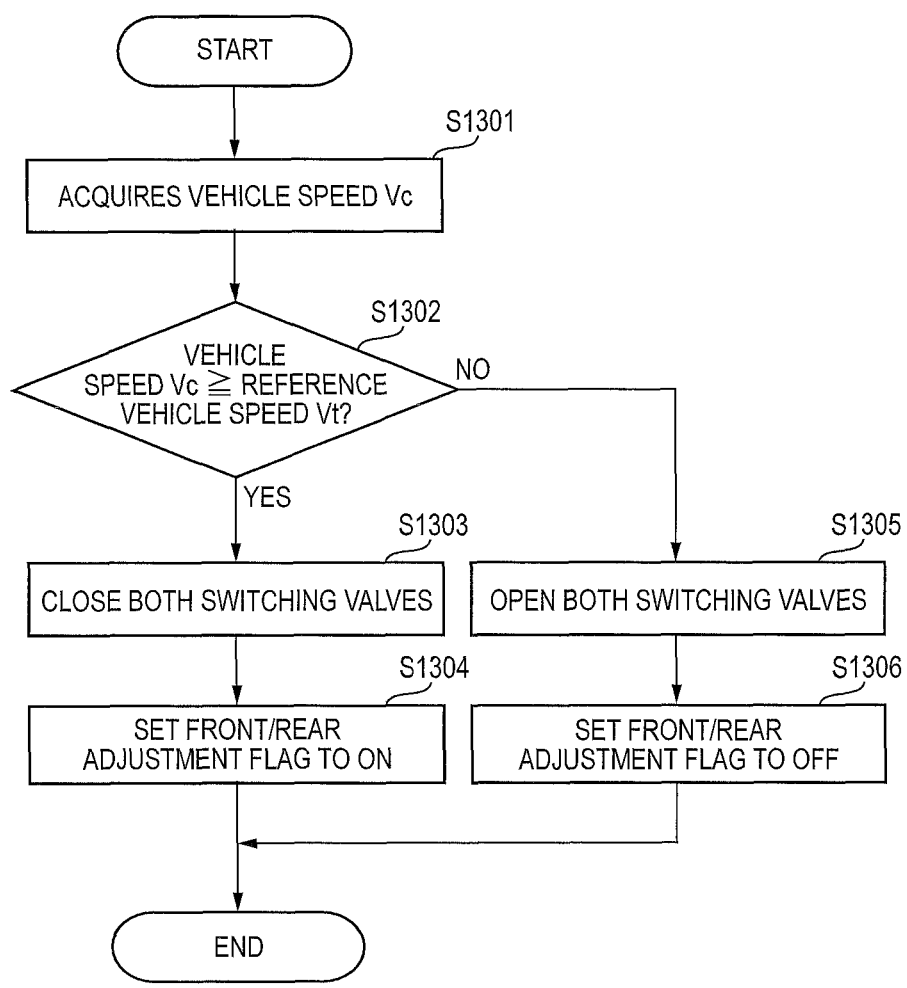
Figure 14:
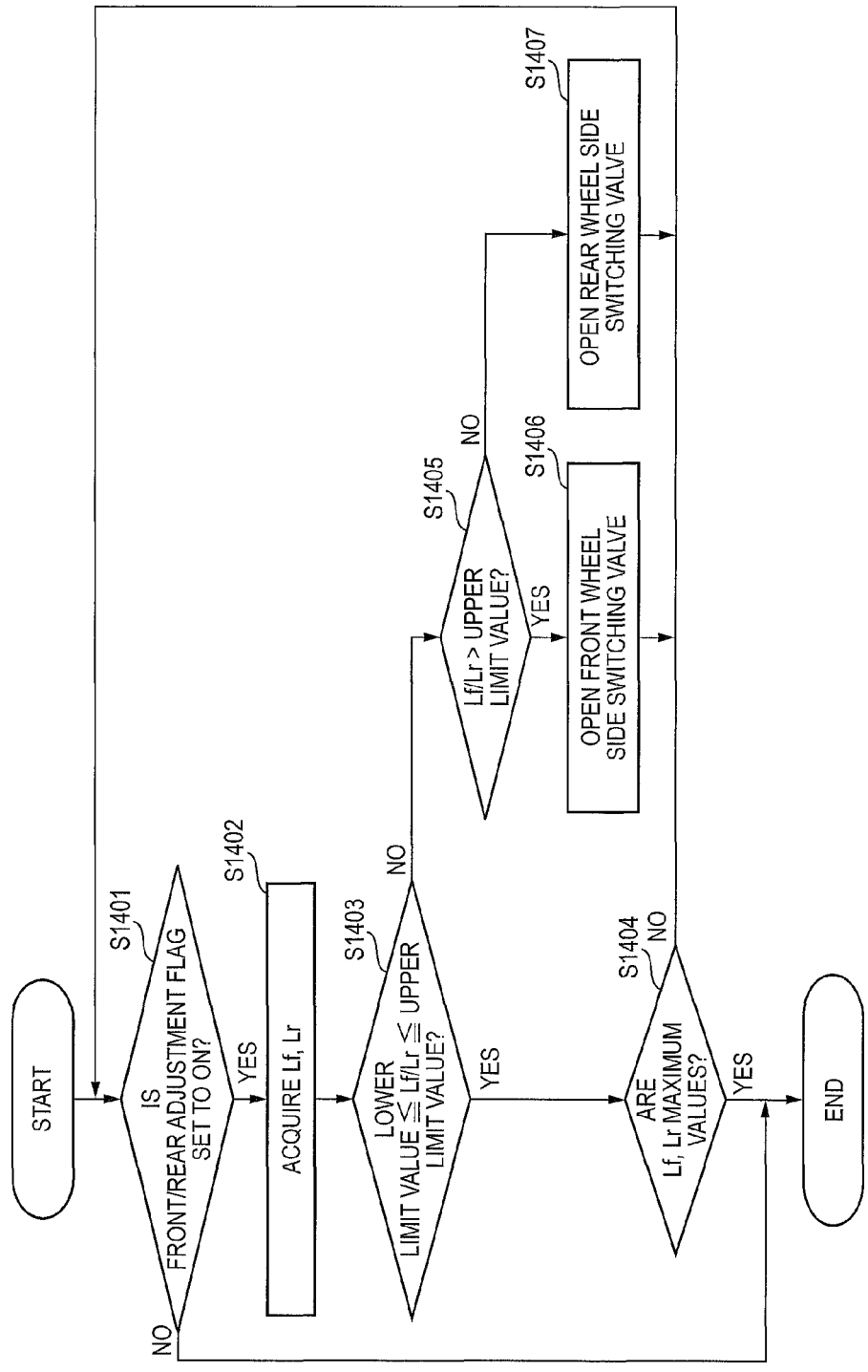

FIG, 9 is a diagram showing a mechanism by which the vehicle height is maintained;

FIG. 10 is a block diagram of a control apparatus;

FIG. 11 is a diagram showing an ideal relationship between the front wheel side speed of movement and the rear wheel side speed of movement;

FIG. 12 is a diagram showing a control mode of a switching valve control unit relating to the present embodiment;

FIG. 13 is a flowchart showing a procedure of opening and closing control processing that is performed by the switching valve control unit; and FIG. 14 is a flowchart showing a procedure of front/rear adjustment processing that is performed by the switching valve control unit.

DESCRIPTION OF THE EMBODIMENTS

Below, embodiments of the present invention are described in detail with reference to the accompanying drawings.

Figure 1:
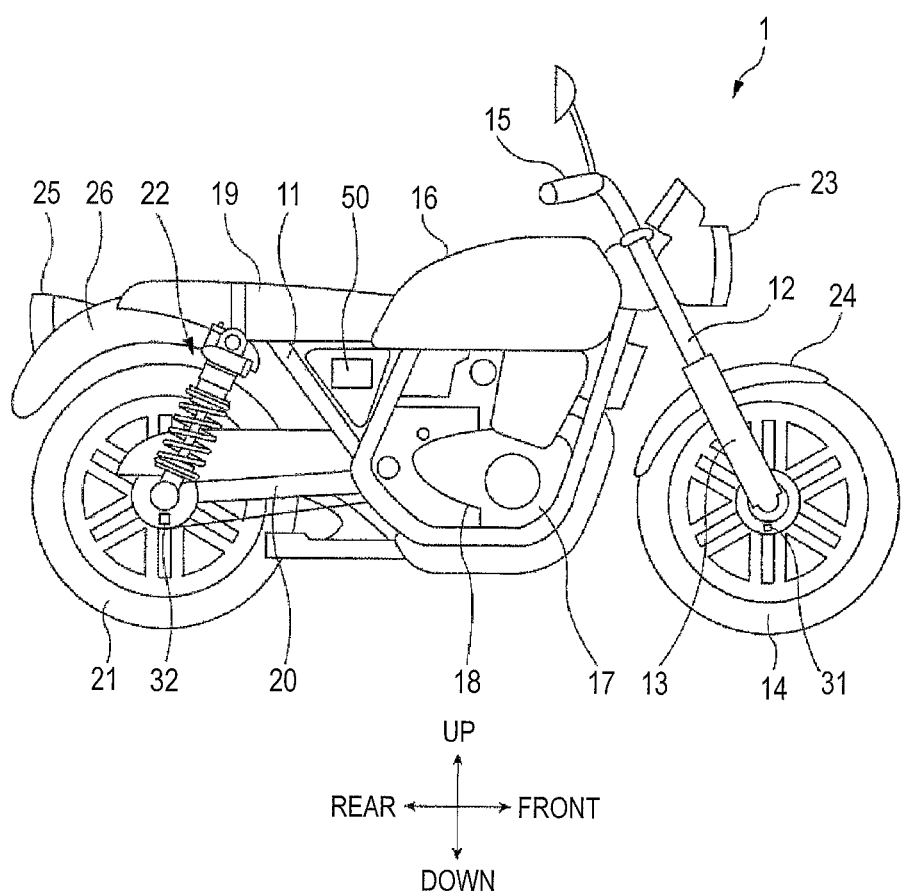
FIG. 1 is a diagram showing a schematic composition of a motorcycle relating to the present embodiment.

FIG. 1 is a diagram showing a schematic composition of a motorcycle 1 relating to the present embodiment.

As shown in FIG. 1, the motorcycle 1 includes a vehicle body frame 11, a head pipe 12 which is installed on a front end portion of the vehicle body frame 11, a front fork 13 which is provided on the head pipe 12, and a front wheel 14 which is installed on a lower end of the front fork 13. The front fork 13 is described in detail below.

Furthermore, the motorcycle 1 has a handle 15 which is installed on an upper portion of the front fork 13, a fuel tank 16 which is installed on a front upper portion of the vehicle body frame 11, and an engine 17 and a transmission 18 which are arranged below the fuel tank 16.

Furthermore, the motorcycle 1 has a seat 19 which is installed on a rear upper portion of the vehicle body frame 11, a swing arm 20 which is installed swingably on a lower portion of the vehicle body frame 11, a rear wheel 21 which is installed on a rear end of the swing arm 20, and a rear suspension 22 which is installed between a rear portion of the swing arm 20 (the rear wheel 21) and a rear portion of the vehicle body frame 11. The rear suspension 22 is described in detailed below.

Furthermore, the motorcycle 1 includes a headlamp 23 which is arranged to the front of the head pipe 12, a front mudguard 24 which is installed on the front fork 13 so as to cover the upper portion of the front wheel 14, a tail lamp 25 which is arranged to the rear of the seat 19, and a rear mudguard 26 which is installed so as to cover the upper portion of the rear wheel 21 below the tail lamp 25.

The motorcycle 1 has a front wheel rotation determination sensor 31 which determines an angle of rotation of the front wheel 14 and a rear wheel rotation determination sensor 32 which determines an angle of rotation of the rear wheel 21.

Furthermore, the motorcycle 1 has a control apparatus 50, which is one example of a control unit for controlling the height of the motorcycle 1 by controlling opening and closing of a front wheel side switching valve 270 (described below) of the front fork 13, and a rear wheel side switching valve 170 (described below) of the rear suspension 22. Output signals from the front wheel rotation determination sensor 31 and the rear wheel rotation determination sensor 32 described above, and the like, are input to the control apparatus 50.

Next, the rear suspension 22 will be described in detail.

Figure 2:
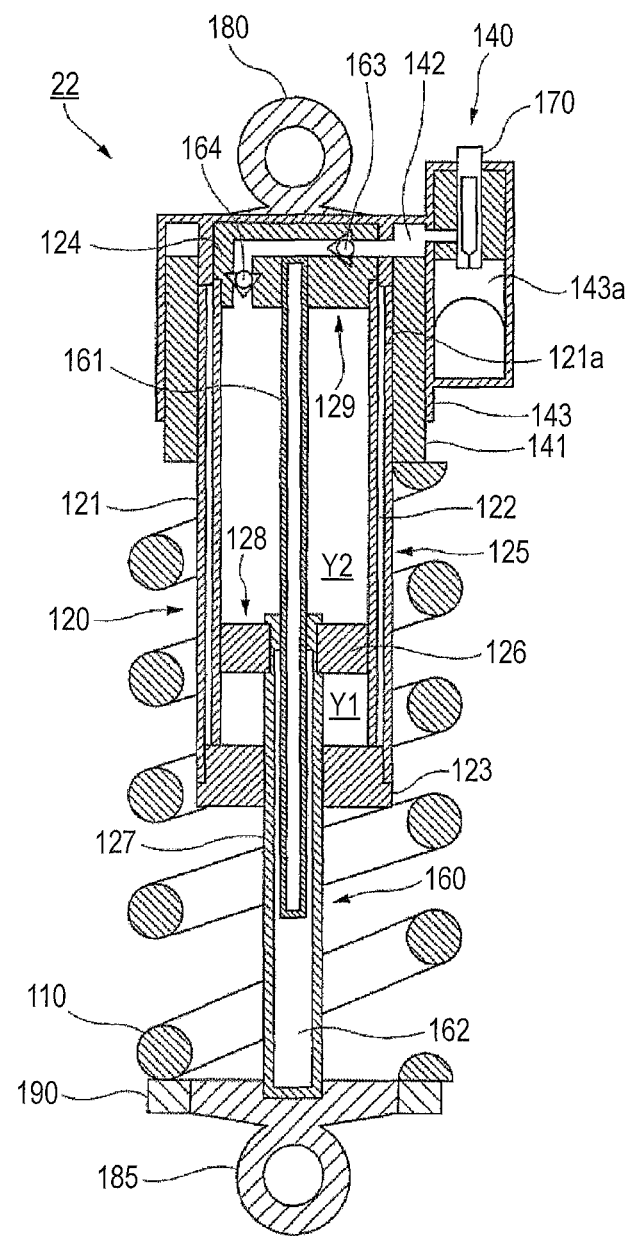
FIG. 2 is a cross-sectional diagram of a rear suspension.

FIG. 2 is a cross-sectional diagram of a rear suspension 22.

The rear suspension 22 is installed between the vehicle body frame 11, which is one example of a vehicle main body of the motorcycle 1, and the rear wheel 21. The rear suspension 22 includes a rear wheel side suspension spring 110 which supports the weight of the motorcycle 1 and absorbs shocks, and a rear wheel side damper 120 which damps vibration of the rear wheel side suspension spring 110. Furthermore, the rear suspension 22 includes a rear wheel side relative position changing apparatus 140, which is one example of a rear wheel side changing unit capable of changing the rear wheel side relative position that is the relative position of the vehicle body frame 11 and the rear wheel 21 by adjusting a spring force of a rear wheel side suspension spring 110, and a rear wheel side liquid supply apparatus 160 which supplies liquid to the rear wheel side relative position changing apparatus 140. Furthermore, the rear suspension 22 includes a vehicle body side installation member 180 for installing the rear suspension 22 on the vehicle body frame 11, an axle side installation member 185 for installing the rear suspension 22 on the rear wheel 21, and a spring support 190 which is installed on the axle side installation member 185 and supports one end portion of the rear wheel side suspension spring 110 in the central axis direction (the lower portion in FIG. 2).

As shown in FIG. 2, the rear wheel side damper 120 includes a cylinder 125 which has a thin round cylindrical outer cylinder 121, a thin round cylindrical inner cylinder 122 which is accommodated in the outer cylinder 121, a bottom lid 123 which closes off one end portion (in FIG. 2, the lower portion) of the round cylindrical outer cylinder 121 in the central axis direction of the round cylindrical shape (the up/down direction in FIG. 2), and an upper lid 124 which closes off the other end portion (in FIG, 2, the upper portion) of the inner cylinder 122 in the central axis direction. Below, the central axis direction of the round cylindrical shape of the outer cylinder 121 is simply called the "central axis direction".

Furthermore, the rear wheel side damper 120 includes a piston 126 which is inserted into the inner cylinder 122 movably in the central axis direction and a piston rod 127 which extends in the central axis direction and supports the piston 126 at the other end portion in the central axis direction (the upper end portion in FIG. 2). The piston 126 contacts an inner peripheral surface of the inner cylinder 122, and divides a space inside the cylinder 125 in which liquid (oil in the present embodiment) is sealed, into a first oil chamber Y1 to one end portion side of the piston 126 in the central axis direction and a second oil chamber Y2 to the other end portion side of the piston 126 in the central axis direction. The piston rod 127 is a round cylindrical member, inside which a pipe 161 (described hereinafter) is inserted.

Furthermore, the rear wheel side damper 120 has a first damping force generating apparatus 128 which is arranged on the other end portion side of the piston rod 127 in the central axis direction and a second damping force generating apparatus 129 which is arranged on the other end portion side of the inner cylinder 122 in the central axis direction. The first damping force generating apparatus 128 and the second damping force generating apparatus 129 damp extension and compression vibrations of the cylinder 125 and the piston rod 127 which occur when shock forces from the road surface are absorbed by the rear wheel side suspension spring 110. The first damping force generating apparatus 128 is arranged so as to function as a connecting path between the first oil chamber Y1 and the second oil chamber Y2, and the second damping force generating apparatus 129 is arranged so as to function as a connecting path between the second oil chamber Y2 and a jack chamber 142 (described hereinafter) of the rear wheel side relative position changing apparatus 140.

The rear wheel side liquid supply apparatus 160 is an apparatus which supplies liquid to the interior of the jack chamber 142 (described hereinafter) of the rear wheel side relative position changing apparatus 140, by a pumping action produced by an extending and contracting motion of the piston rod 127 with respect to the cylinder 125.

The rear wheel side liquid supply apparatus 160 has a round cylindrical pipe 161 which is fixed so as to extend in the central axis direction to the upper lid 124 of the rear wheel side damper 120. The pipe 161 is introduced coaxially inside the pump chamber 162, which is the interior part of the round cylindrical piston rod 127.

Furthermore, the rear wheel side liquid supply apparatus 160 includes a discharge check valve 163 which discharges liquid inside the pump chamber 162 that has been pressurized by movement of the piston rod 127 in a direction advancing into the cylinder 125 and the pipe 161, to the side of the jack chamber 142 (described hereinafter), and an intake check valve 164 which takes liquid from inside the cylinder 125 into the pump chamber 162 which is set to a negative pressure by movement of the piston rod 127 in a direction retracting from the cylinder 125 and the pipe 161.

Figure 3A:
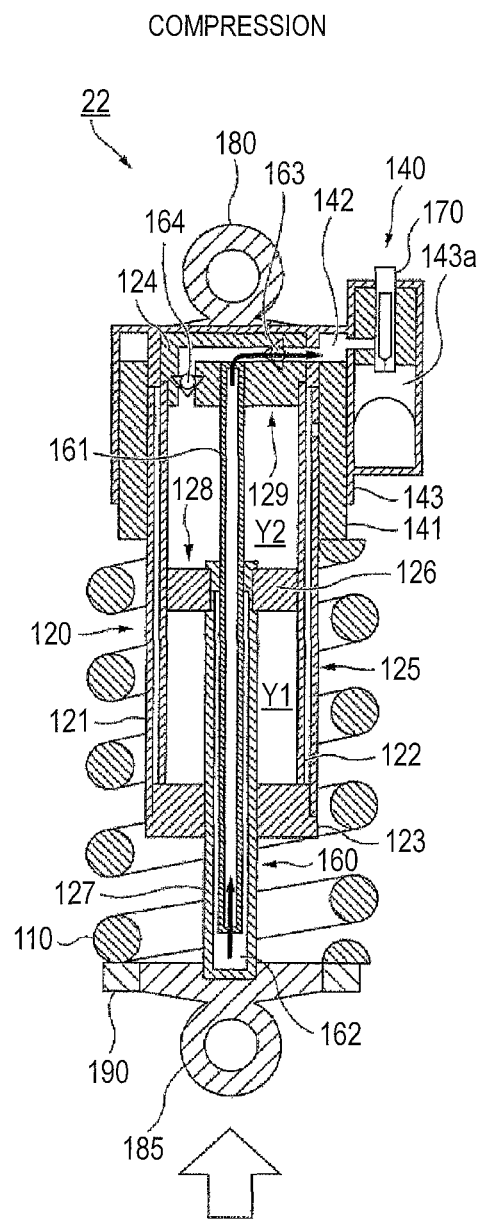
FIGS. 3A and 3B are diagrams illustrating an action of the rear wheel side liquid supply apparatus.
Figure 3B:
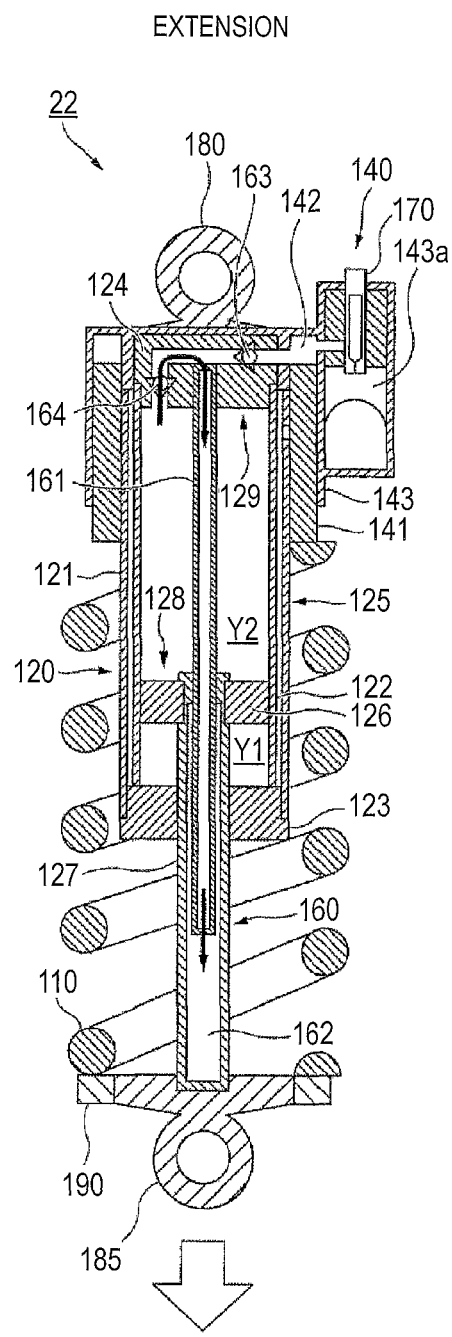

FIGS. 3A and 3B are diagrams illustrating an action of the rear wheel side liquid supply apparatus 160.

When the motorcycle 1 travels and the rear suspension 22 receives forces from undulations in the road surface, the rear wheel side liquid supply apparatus 160 having the composition described above performs a pumping action due to an extending and contracting motion of the piston rod 127 which advances into and retracts from the cylinder 125 and the pipe 161. When the pump chamber 162 becomes pressurized due to this pumping action, the liquid inside the pump chamber 162 opens the discharge check valve 163 and is discharged into the jack chamber 142 of the rear wheel side relative position changing apparatus 140 (see FIG. 3A). When the pump chamber 162 reaches a negative pressure, the liquid inside the second oil chamber Y2 of the cylinder 125 opens the intake check valve 164 and is taken into the pump chamber 162 (see FIG. 3B).

The rear wheel side relative position changing apparatus 140 includes a supporting member 141 which is arranged so as to cover an outer periphery of the cylinder 125 of the rear wheel side damper 120 and which supports the other end portion of the rear wheel side suspension spring 110 in the central axis direction (the upper portion in FIG. 2), and a hydraulic jack 143 which is arranged so as to cover the outer periphery of the other end portion side of the cylinder 125 in the central axis direction (the upper side in FIG. 2) and which forms the jack chamber 142 together with the supporting member 141. The supporting member 141 moves in the central axis direction with respect to the hydraulic jack 143, due to the liquid inside the cylinder 125 filling into the jack chamber 142, and due to the liquid being expelled from inside the jack chamber 142. In the hydraulic jack 143, since the vehicle body side installation member 180 is installed in an upper portion, and the supporting member 141 moves in the central axis direction with respect to the hydraulic jack 143, then the spring force of the rear wheel side suspension spring 110 varies, and consequently, the relative position of the seat 19 with respect to the rear wheel 21 changes.

Furthermore, the rear wheel side relative position changing apparatus 140 has a rear wheel side switching valve 170 which closes in such a manner that the liquid supplied to the jack chamber 142 collects in the jack chamber 142 and which opens in such a manner that the liquid supplied to the jack chamber 142 is expelled to a liquid reservoir chamber 143a which is formed in the hydraulic jack 143. A commonly known solenoid actuator can be cited as an example of the rear wheel side switching valve 170.

Figure 4A:
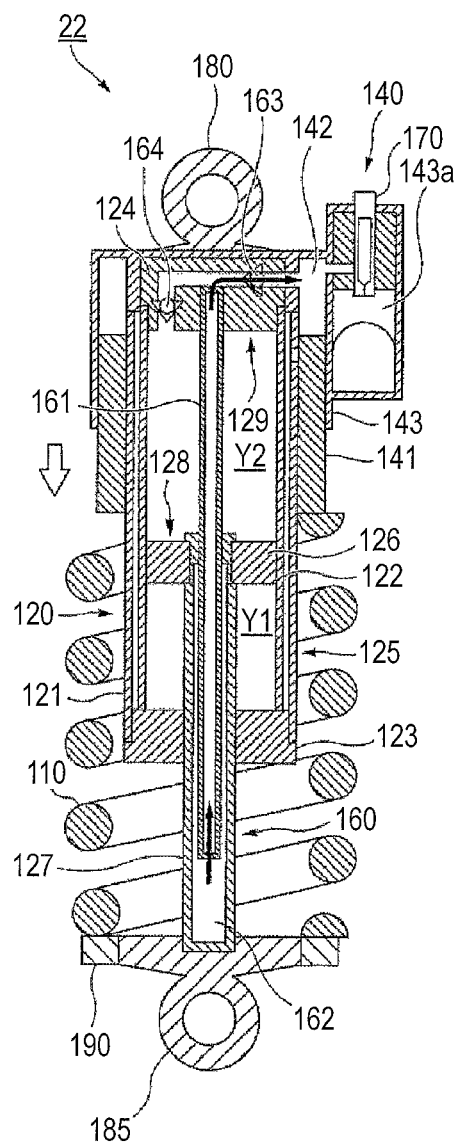
FIGS. 4A and 4B are diagrams illustrating vehicle height adjustment by the rear wheel side liquid supply apparatus.
Figure 4B:
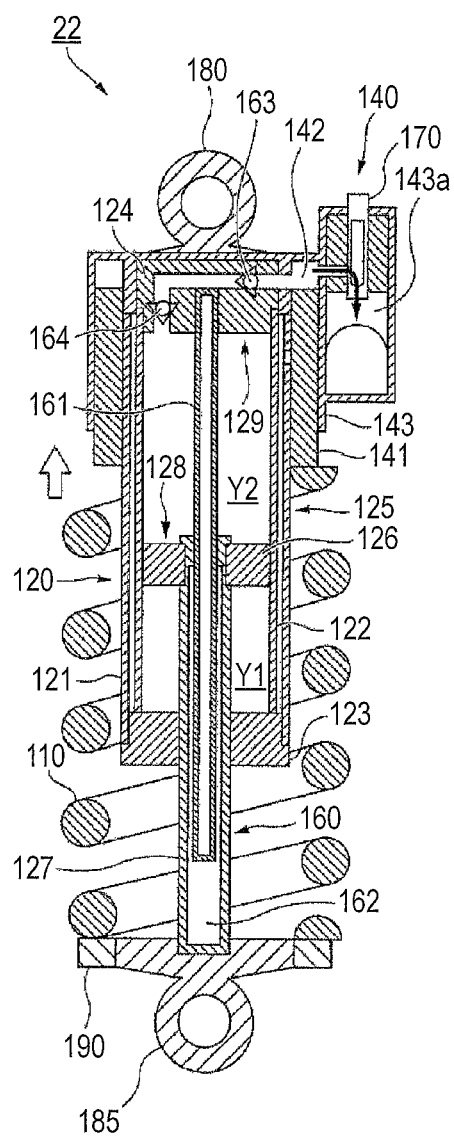

FIGS. 4A and 4B are diagrams illustrating vehicle height adjustment by the rear wheel side relative position changing apparatus 140. When liquid is supplied to the jack chamber 142 by the rear wheel side liquid supply apparatus 160 while the rear wheel side switching valve 170 is closed, the liquid is filled into the jack chamber 142, the supporting member 141 moves to one end portion side in the central axis direction (the lower side in FIGS. 4A and 4B) with respect to the hydraulic jack 143, and the spring length of the rear wheel side suspension spring 110 becomes shorter (see FIG. 4A). On the other hand, if the rear wheel side switching valve 170 is opened, the liquid inside the jack chamber 142 is expelled to the liquid reservoir chamber 143a, the supporting member 141 moves to the other end portion side in the central axis direction (the upper side in FIGS. 4A and 4B) with respect to the hydraulic jack 143, and the spring length of the rear wheel suspension spring 110 becomes longer (see FIG. 4B).

If the spring length of the rear wheel side suspension spring 110 is made shorter by the movement of the supporting member 141 with respect to the hydraulic jack 143, then the spring force of the rear wheel side suspension spring 110 that is pushing on the supporting member 141 becomes larger compared to before the movement of the supporting member 141 with respect to the hydraulic jack 143. In this case, if the same force acts on one end portion side in the central axis direction (the lower side in FIGS. 4A and 4B) from the side of the vehicle body frame 11 (seat 19), then the amount of sinking of the rear suspension 22 (the change in the distance between the vehicle body side installation member 180 and the axle side installation member 185) becomes smaller. Therefore, if the spring length of the rear wheel side suspension spring 110 is made shorter by the movement of the supporting member 141 with respect to the hydraulic jack 143, then the height of the seat 19 rises (the vehicle height is raised) compared to before the movement of the supporting member 141 with respect to the hydraulic jack 143. In other words, the vehicle height is raised by closing the rear wheel side switching valve 170.

On the other hand, if the spring length of the rear wheel side suspension spring 110 is made longer by the movement of the supporting member 141 with respect to the hydraulic jack 143, then the spring force of the rear wheel side suspension spring 110 that is pushing on the supporting member 141 becomes smaller compared to before the movement of the supporting member 141 with respect to the hydraulic jack 143. In this case, if the same force acts on one end portion side in the central axis direction (the lower side in FIGS. 4A and 4B) from the side of the vehicle body frame 11 (seat 19), then the amount of sinking of the rear suspension 22 (the change in the distance between the vehicle body side installation member 180 and the axle side installation member 185) becomes larger. Therefore, if the spring length of the rear wheel side suspension spring 110 is made longer by the movement of the supporting member 141 with respect to the hydraulic jack 143, then the height of the seat 19 falls (the vehicle height is lowered) compared to before the movement of the supporting member 141 with respect to the hydraulic jack 143. In other words, by opening the rear wheel side switching valve 170, the vehicle height becomes lower than when the rear wheel side switching valve 170 is closed.

The opening and closing of the rear wheel side switching valve 170 is controlled by the control apparatus 50.

Furthermore, if the rear wheel side switching valve 170 has been opened, the destination for expelling the liquid that has been supplied to the jack chamber 142 may be either the first oil chamber Y1 and/or the second oil chamber Y2 in the cylinder 125.

Moreover, as shown in FIG. 2, when the supporting member 141 has moved to a predetermined limit position on the one end portion side of the central axis direction (the lower side in FIG. 2) with respect to the hydraulic jack 143, a return path 121a is formed in the outer cylinder 121 of the cylinder 125 by which the liquid in the jack chamber 142 returns to the cylinder 125.

Figure 5:
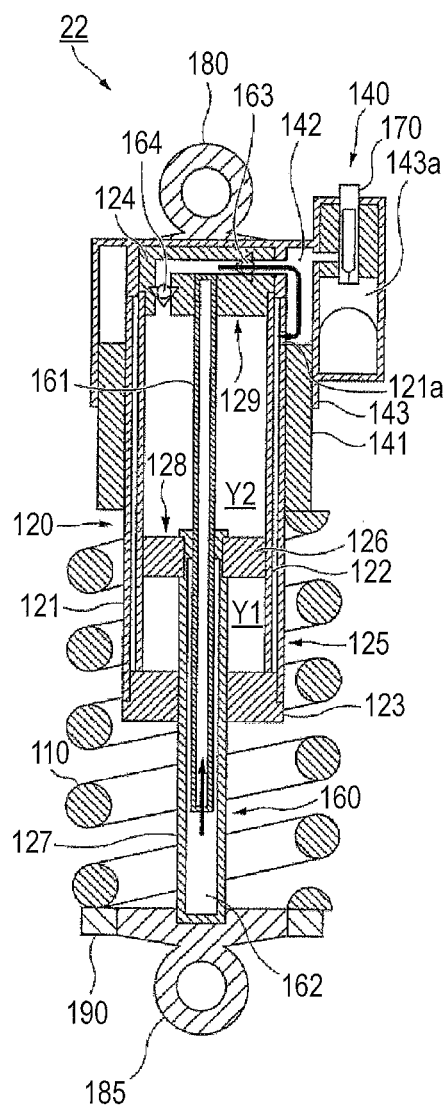
FIG. 5 is a diagram showing a mechanism by which the vehicle height is maintained.

FIG. 5 is a diagram showing a mechanism by which the vehicle height is maintained, Due to this return path 121a, even if liquid is supplied continuously into the jack chamber 142 while the rear wheel side switching valve 170 is closed, since the supplied liquid is returned to the cylinder 125, the position of the supporting member 141 with respect to the hydraulic jack 143, and hence the height of the seat 19 (vehicle height), is maintained.

Furthermore, the rear suspension 22 has a rear wheel side relative position determination unit 195 (see FIG. 10) which determines a relative position of the vehicle body frame 11 and the rear wheel 21. As an example of the rear wheel side relative position determination unit 195, it is possible to cite a unit which determines an amount of movement of the supporting member 141 with respect to the hydraulic jack 143 in the central axis direction, in other words, an amount of movement of the supporting member 141 with respect to the vehicle body side installation member 180 in the central axis direction. More specifically, it is possible to cite, by way of an example, a unit in which a coil is wound about an outer peripheral surface of the supporting member 141, the hydraulic jack 143 is made from a magnetic body, and the amount of movement of the supporting member 141 is determined on the basis of the impedance of the coil which changes in accordance with the movement of the supporting member 141 with respect to the hydraulic jack 143 in the central axis direction.

Next, the front fork 13 will be described in detail.

Figure 6:
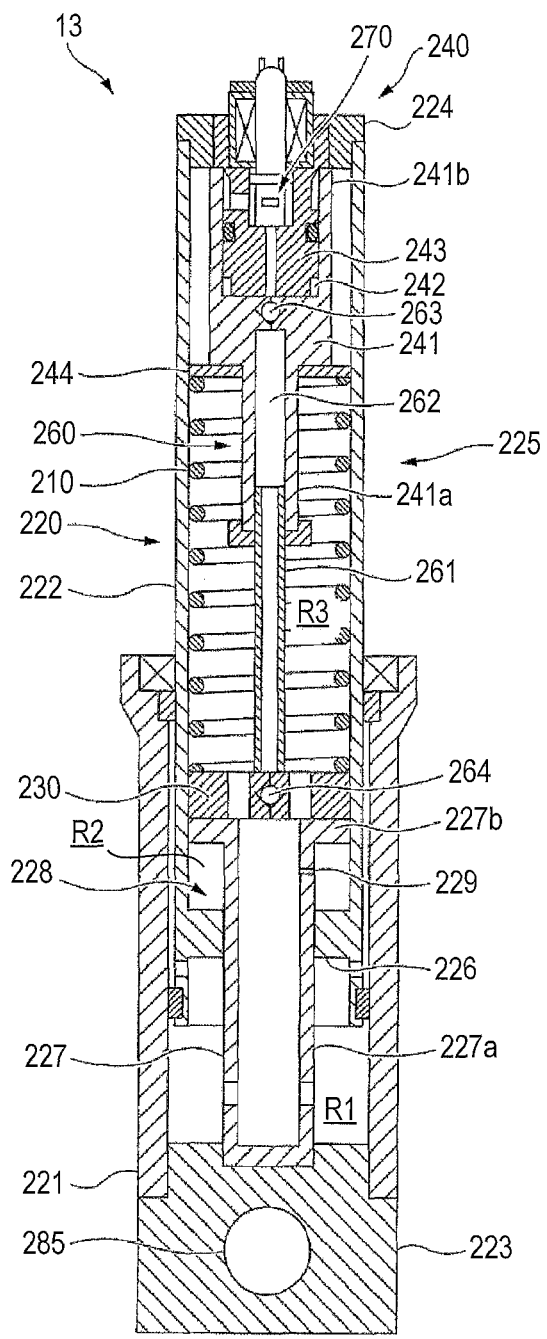
FIG. 6 is a cross-sectional diagram of a front fork.

FIG. 6 is a cross-sectional diagram of the front fork 13.

The front fork 13 is installed between the vehicle body frame 11 and the front wheel 14. The front fork 13 includes a front wheel side suspension spring 210 which supports the weight of the motorcycle 1 and absorbs shocks, and a front wheel side damper 220 which damps vibration of the front wheel side suspension spring 210. Furthermore, the front fork 13 includes a front wheel side relative position changing apparatus 240, which is one example of a front wheel side changing unit capable of changing the front wheel side relative position, namely, the relative position of the vehicle body frame 11 and the front wheel 14, by adjusting a spring force of the front wheel side suspension spring 210, and a front wheel side liquid supply apparatus 260 which supplies liquid to the front wheel side relative position changing apparatus 240. Furthermore, the front fork 13 includes an axle side installation member 285 for installing the front fork 13 on the front wheel 14 and a head pipe side installation section (not illustrated) for installing the front fork 13 on the head pipe 12.

As shown in FIG. 6, the front wheel side damper 220 includes a cylinder 225 which has a thin round cylindrical outer cylinder 221, a thin round cylindrical inner cylinder 222, one end portion of which is inserted from the other end portion (the upper portion in FIG. 6) of the round cylindrical outer cylinder 221 in the central axis direction (the up/down direction in FIG. 6), a bottom lid 223 which closes off one end portion (in FIG. 6, the lower portion) of the outer cylinder 221 in the central axis direction, and an upper lid 224 which closes off the other end portion (in FIG. 6, the upper portion) of the inner cylinder 222 in the central axis direction. The inner cylinder 222 is inserted slidably with respect to the outer cylinder 221.

Furthermore, the front wheel side damper 220 includes a piston rod 227 which is installed on the bottom lid 223 so as to extend in the central axis direction. The piston rod 227 includes a round cylindrical section 227a having a round cylindrical shape extending in the central axis direction, and a round cylindrical flange section 227b which is provided on another end portion (in FIG. 6, the upper portion) of the round cylindrical portion 227a in the central axis direction. Furthermore, the front wheel side damper 220 includes a piston 226 which is fixed to one end portion side of the inner cylinder 222 in the central axis direction (the lower side in FIG. 6) and which is slidable with respect to the outer periphery of the round cylindrical section 227a of the piston rod 227. The piston 226 contacts an outer peripheral surface of the round cylindrical section 227a of the piston rod 227, and divides a space inside the cylinder 225 in which liquid (oil in the present embodiment) is sealed, into a first oil chamber R1 to one end portion side of the piston 226 in the central axis direction and a second oil chamber R2 to the other end portion side of the piston 226 in the central axis direction.

Moreover, the front wheel side damper 220 includes a covering member 230 which is provided above the piston rod 227 and which covers the opening of the round cylindrical section 227a of the piston rod 227. The covering member 230 supports one end portion of the front wheel side suspension spring 210 in the central axis direction (the lower end portion in FIG. 6). The front wheel side damper 220 has an oil reservoir chamber R3 which is formed in a space inside the inner cylinder 222 on the other end portion side from the covering member 230 in the central axis direction, and a space inside the round cylindrical portion 227a of the piston rod 227. The oil reservoir chamber R3 is always connected to the first oil chamber R1 and the second oil chamber R2.

Furthermore, the front wheel side damper 220 includes a first damping force generating section 228 which is provided in the piston 226 and a second damping force generating section 229 which is formed in the piston rod 227. The first damping force generating section 228 and the second damping force generating section 229 damp extension and compression vibrations of the inner cylinder 222 and the piston rod 227 which occur when shock forces from the road surface are absorbed by the front wheel side suspension spring 210. The first damping force generating section 228 is arranged so as to function as a connecting path between the first oil chamber R1 and the second oil chamber R2, and the second damping force generating section 229 is formed so as to function as a connecting path between the first oil chamber R1, the second oil chamber R2 and the oil reservoir chamber R3.

The front wheel side liquid supply apparatus 260 is an apparatus which supplies liquid to the interior of the jack chamber 242 (described hereinafter) of the front wheel side relative position changing apparatus 240, by a pumping action produced by extending and contracting motion of the piston rod 227 with respect to the inner cylinder 222.

The front wheel side liquid supply apparatus 260 has a round cylindrical pipe 261 which is fixed so as to extend in the central axis direction to the covering member 230 of the front wheel side damper 220. The pipe 261 is inserted coaxially inside the pump chamber 262, which is the interior of the lower side round cylindrical section 241a of the supporting member 241 of the front wheel side relative position changing apparatus 240, which is described hereinafter.

Furthermore, the front wheel side liquid supply apparatus 260 includes a discharge check valve 263 which discharges liquid inside the pump chamber 262 that has been pressurized by movement of the piston rod 227 in a direction advancing into the cylinder 222, to the side of the jack chamber 242 (described hereinafter), and an intake check valve 264 which takes liquid from inside the oil reservoir chamber R3 into the pump chamber 262 which is set to a negative pressure by movement of the piston rod 227 in a direction retracting from the inner cylinder 222.

Figure 7:
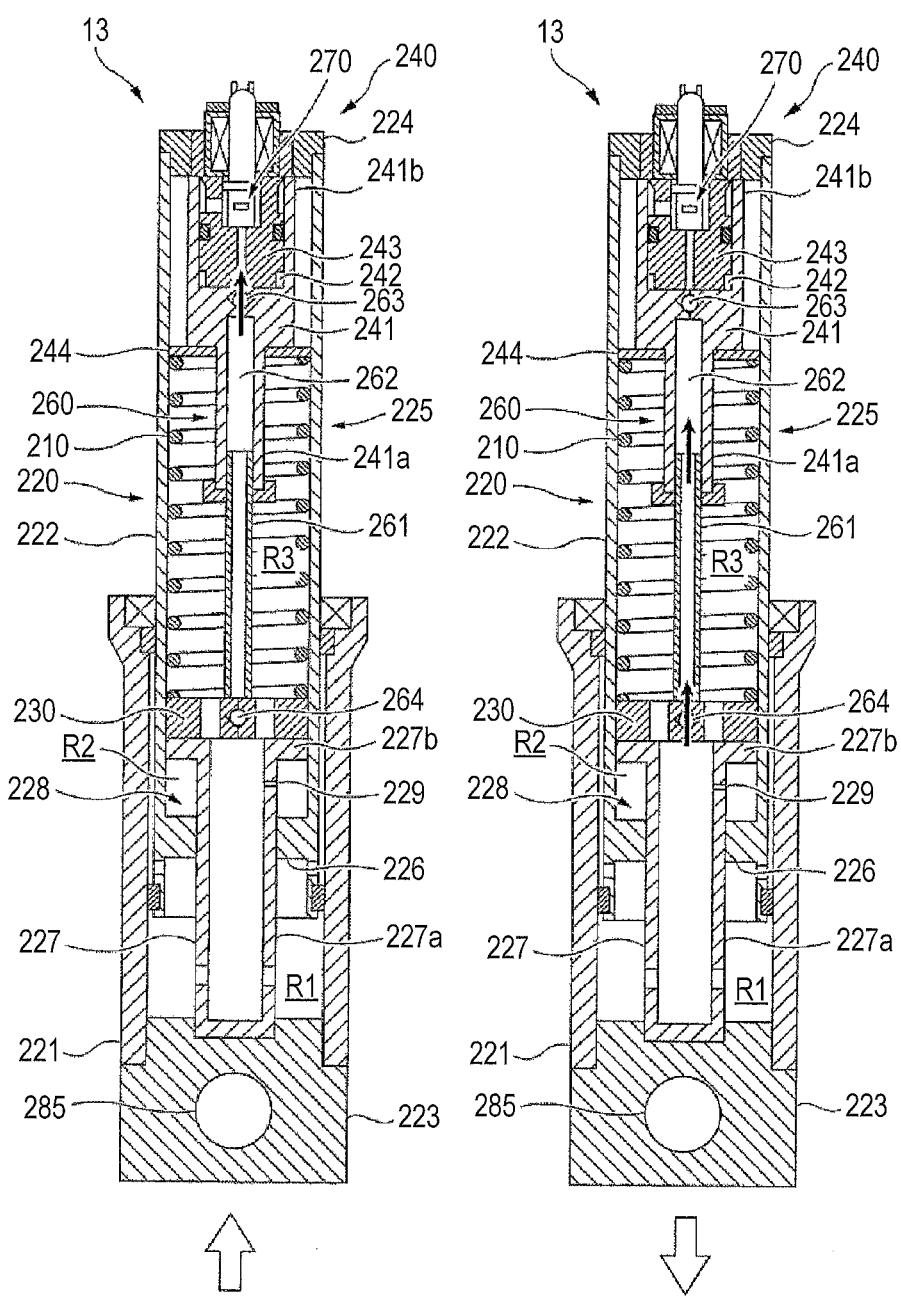
FIGS. 7A and 7B are diagrams illustrating an action of the rear wheel side liquid supply apparatus.

FIGS. 7A and 7B are diagrams illustrating an action of the front wheel side liquid supply apparatus 260.

When the motorcycle 1 travels and the front fork 13 receives force due to the undulations in the road surface, the piston rod 227 advances into and retracts from the inner cylinder 222, and hence the front wheel side liquid supply apparatus 260 which is composed as described above performs a pumping action due to the pipe 261 advancing into and retracting from the supporting member 241 of the front wheel side relative position changing apparatus 240. When the pump chamber 262 becomes pressurized due to this pumping action, the liquid inside the pump chamber 262 opens the discharge check valve 263 and is discharged into the jack chamber 242 of the front wheel side relative position changing apparatus 240 (see FIG. 7A). When the pump chamber 262 reaches a negative pressure, the liquid inside the oil reservoir chamber R3 opens the intake check valve 264 and is taken into the pump chamber 262 (see FIG. 7B).

The front wheel side relative position changing apparatus 240 is provided with a supporting member 241 which is arranged inside the inner cylinder 222 of the front wheel side damper 220, and which supports the other end portion (in FIG. 6, the upper portion) of the front wheel side suspension spring 210, in the central axis direction, via the round disk-shaped spring support 244. The supporting member 241 has a lower side round cylindrical section 241a which is formed in a round cylindrical shape on one end portion side in the central axis direction (the lower side in FIG. 6), and an upper side round cylindrical section 241b which is formed in a round cylindrical shape on the other end portion side in the central axis direction (the upper side in FIG. 6). The pipe 261 is inserted into the lower side round cylindrical section 241a.

Furthermore, the front wheel side relative position changing apparatus 240 includes a hydraulic jack 243 which is fitted inside the upper side round cylindrical section 241b of the supporting member 241 and which forms a jack chamber 242 together with the supporting member 241. The supporting member 241 moves in the central axis direction with respect to the hydraulic jack 243, due to the liquid inside the cylinder 225 filling into the jack chamber 242, and due to the liquid being expelled from inside the jack chamber 242. In the hydraulic jack 243, since the pipe side installation member (not illustrated) is installed in an upper portion, and the supporting member 241 moves in the central axis direction with respect to the hydraulic jack 243, then the spring force of the front wheel side suspension spring 210 varies, and consequently, the relative position of the seat 19 with respect to the front wheel 14 changes.

Furthermore, the front wheel side relative position changing apparatus 240 has a front wheel side switching valve 270 which closes in such a manner that the liquid supplied to the jack chamber 242 collects in the jack chamber 242 and which opens in such a manner that the liquid supplied to the jack chamber 242 is expelled to the oil reservoir chamber R3. A commonly known solenoid actuator can be cited as an example of the front wheel side switching valve 270.

Figure 8:
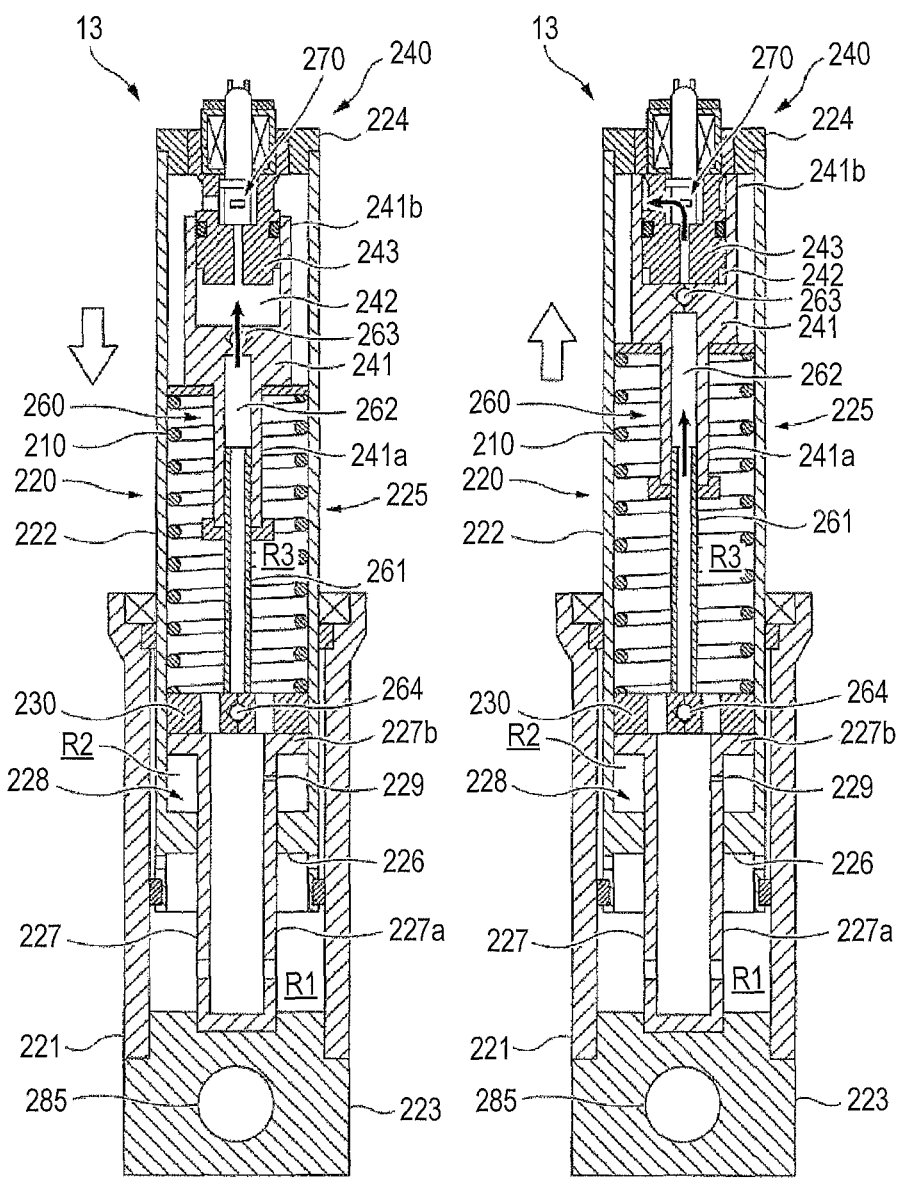
FIGS. 8A and 8B are diagrams illustrating vehicle height adjustment by the front wheel side liquid supply apparatus.

FIGS. 8A and 8B are diagrams illustrating vehicle height adjustment by the front wheel side relative position changing apparatus 240.

When liquid is supplied to the jack chamber 242 by the front wheel side liquid supply apparatus 260 while the front wheel side switching valve 270 is closed, the liquid is filled into the jack chamber 242, the supporting member 241 moves to one end portion side in the central axis direction (the lower side in FIGS. 8A and 8B) with respect to the hydraulic jack 243, and the spring length of the front wheel side suspension spring 210 becomes shorter (see FIG. 8A). On the other hand, if the front wheel side switching valve 270 is opened, the liquid inside the jack chamber 242 is expelled to the liquid reservoir chamber R3, the supporting member 241 moves to the other end portion side in the central axis direction (the upper side in FIGS. 8A and 8B) with respect to the hydraulic jack 243, and the spring length of the front wheel suspension spring 210 becomes longer (see FIG. 8B).

If the spring length of the front wheel side suspension spring 210 is made shorter by the movement of the supporting member 241 with respect to the hydraulic jack 243, then the spring force of the front wheel side suspension spring 210 that is pushing on the supporting member 241 becomes larger compared to before the movement of the supporting member 241 with respect to the hydraulic jack 243. In this case, if the same force acts on one end portion side in the central axis direction (the lower side in FIGS. 8A and 8B) from the side of the vehicle body frame 11 (seat 19), then the amount of sinking of the front fork 13 (the change in the distance between the head pipe side installation section (not illustrated) and the axle side installation member 285) becomes smaller. Therefore, if the spring length of the front wheel side suspension spring 210 is made shorter by the movement of the supporting member 241 with respect to the hydraulic jack 243, then the height of the seat 19 rises (the vehicle height is raised) compared to before the movement of the supporting member 241 with respect to the hydraulic jack 243. In other words, the vehicle height is raised by closing the front wheel side switching valve 270.

On the other hand, if the spring length of the front wheel side suspension spring 210 is made longer by the movement of the supporting member 241 with respect to the hydraulic jack 243, then the spring force of the front wheel side suspension spring 210 that is pushing on the supporting member 241 becomes smaller compared to before the movement of the supporting member 241 with respect to the hydraulic jack 243. In this case, if the same force acts on one end portion side in the central axis direction (the lower side in FIGS. 8A and 8B) from the side of the vehicle body frame 11 (seat 19), then the amount of sinking of the front fork 13 (the change in the distance between the head pipe side installation section (not illustrated) and the axle side installation member 285) becomes larger. Therefore, if the spring length of the front wheel side suspension spring 210 is made longer by the movement of the supporting member 241 with respect to the hydraulic jack 243, then the height of the seat 19 falls (the vehicle height is lowered) compared to before the movement of the supporting member 241 with respect to the hydraulic jack 243. In other words, by opening the front wheel side switching valve 270, the vehicle height becomes lower than when the front wheel side switching valve 270 is closed.

The opening and closing of the front wheel side switching valve 270 is controlled by the control apparatus 50.

Furthermore, if the front wheel side switching valve 270 has been opened, the destination for expelling the liquid that has been supplied to the jack chamber 242 may be either the first oil chamber R1 and/or the second oil chamber R2.

Figure 9:
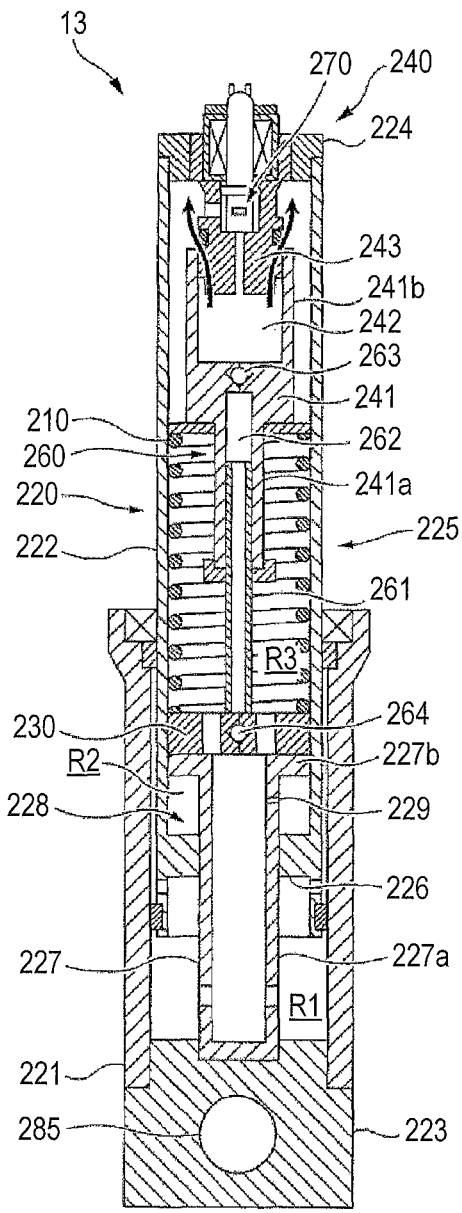

FIG. 9 is a diagram showing a mechanism by which the vehicle height is maintained.

As shown in FIG. 9, when the supporting member 241 is moved to a predetermined limit position at one end portion side (the lower side in FIGS. 8A and 8B) of the central axis direction, with respect to the hydraulic jack 243, a return path (not illustrated) is formed on the outer peripheral surface of the hydraulic jack 243 to return the liquid in the jack chamber 242 to the oil reservoir chamber R3.

Due to this return path, even if liquid is supplied continuously into the jack chamber 242 while the front wheel side switching valve 270 is closed, since the supplied liquid is returned to the oil reservoir chamber R3, then the position of the supporting member 241 with respect to the hydraulic jack 243, and hence the height of the seat 19 (vehicle height), is maintained.

Furthermore, a front fork 13 has a front wheel side relative position determination unit 295 (see FIG. 10) which determines a relative position of the vehicle body frame 11 and the front wheel 14. As an example of the front wheel side relative position determination unit 295, it is possible to cite a unit which determines an amount of movement of the supporting member 241 with respect to the hydraulic jack 243 in the central axis direction, in other words, an amount of movement of the supporting member 241 with respect to the head pipe side installation member in the central axis direction. To give a specific example, it is possible to cite a unit in which a coil is wound about an outer peripheral surface of the inner cylinder 222 at a position in the central axis which corresponds to the supporting member 241, the supporting member 241 is made from a magnetic body, and the amount of movement of the supporting member 241 is determined on the basis of the impedance of the coil which changes in accordance with the movement of the supporting member 241 with respect to the hydraulic jack 243 in the central axis direction.

Next, the control apparatus 50 will be described.

FIG. 10 is a block diagram of the control apparatus 50.

The control apparatus 50 includes a CPU, a ROM which stores programs and various data, and the like, which is executed by the CPU, a RAM which is used as a working memory for the CPU, or the like, and an electrically erasable & programmable read only memory (EEPROM). Output signals from the front wheel rotation determination sensor 31, the rear wheel rotation determination sensor 32, the front wheel side relative position determination unit 295 and the rear wheel side relative position determination unit 195, and the like, described above, are input to the control apparatus 50.

The control apparatus 50 includes: a front wheel speed of rotation calculation unit 51 which calculates a speed of rotation of the front wheel 14 on the basis of the output signal from the front wheel rotation determination sensor 31, and a rear wheel speed of rotation calculation unit 52 which calculates a speed of rotation of the rear wheel 21 on the basis of the output signal from the rear wheel rotation determination sensor 32. The front wheel speed of rotation calculation unit 51 and the rear wheel speed of rotation calculation unit 52 respectively ascertain an angle of rotation on the basis of a pulse signal, which is an output signal from a sensor, and calculate a speed of rotation by differentiating the angle of rotation by the elapsed time.

The control apparatus 50 includes a front wheel side amount of movement ascertaining unit 53 which ascertains an amount of movement of the supporting member 241 of the front wheel side relative position changing apparatus 240 (see FIGS. 8A and 8B), with respect to the hydraulic jack 243 (this amount of movement is called the "front wheel side amount of movement Lf" below), on the basis of the output signal from the front wheel side relative position determination unit 295. Furthermore, the control apparatus 50 includes a rear wheel side amount of movement ascertaining unit 54 which ascertains an amount of movement of the supporting member 141 of the rear wheel side relative position changing apparatus 140 with respect to the hydraulic jack 143 (this amount of movement is called the "rear wheel side amount of movement Lr" below), on the basis of the output signal from the rear wheel side relative position determination unit 195. The front wheel side amount of movement ascertaining unit 53 and the rear wheel side amount of movement ascertaining unit 54 respectively ascertain the front wheel side amount of movement Lf and the rear wheel side amount of movement Lr, on the basis of a relationship between the impedance of the coil and the front wheel side amount of movement Lf or the rear wheel side amount of movement Lr, this relationship being previously stored in the ROM.

Moreover, the control apparatus 50 also includes a vehicle speed ascertaining unit 56 which ascertains the vehicle speed Vc, which is the speed of movement of the motorcycle 1, on the basis of the speed of rotation of the front wheel 14 which is calculated by the front wheel speed of rotation calculation unit 51, and/or the speed of rotation of the rear wheel 21 which is calculated by the rear wheel speed of rotation calculation unit 52. The vehicle speed ascertaining unit 56 ascertains the vehicle speed Vc by calculating the speed of movement of the front wheel 14 or the rear wheel 21 by using the front wheel speed of rotation Rf or the rear wheel speed of rotation Rr. The speed of movement of the front wheel 14 can be calculated by using the front wheel speed of rotation Rf and the outer diameter of the tire of the front wheel 14, and the speed of movement of the rear wheel 21 can be calculated by using the outer diameter of the rear wheel speed of rotation Rr and the outer diameter of the tire of the rear wheel 21. When the motorcycle 1 is traveling in a normal state, the vehicle speed. Vc can be taken to be equal to the speed of movement of the front wheel 14 and/or the speed of movement of the rear wheel 21. Furthermore, the vehicle speed ascertaining unit 56 may ascertain the vehicle speed Ye by calculating an average speed of movement of the front wheel 14 and the rear wheel 21 by using an average value of the front wheel speed of rotation Rf and the rear wheel speed of rotation Rr.

Moreover, the control apparatus 50 has a switching valve control unit 57 which controls opening and closing of the front wheel side switching valve 270 of the front wheel side relative position changing apparatus 240 and controls opening and closing of the rear wheel side switching valve 170 of the rear wheel side relative position changing apparatus 140, on the basis of the vehicle speed Vc which is ascertained by the vehicle speed ascertaining unit 56. The switching valve control unit 57 controls the opening and closing of the front wheel side switching valve 270 and the opening and closing of the rear wheel side switching valve 170 so as to raise the vehicle height and thereby improve steerability, when the motorcycle 1 is travelling properly (at a speed equal to or greater than the reference vehicle speed Vt (where the reference vehicle speed Vt depends on the specifications of the motorcycle 1)) and so as to lower the vehicle height in order to make it easier to get on and off the motorcycle, when it is considered that the rider is to get on or off the motorcycle.

Furthermore, the switching valve control unit 57 controls the opening and closing of the front wheel side switching valve 270 and the opening and closing of the rear wheel side switching valve 170, in such a manner that a rate of increase in the vehicle height by the front wheel side relative position changing apparatus 240 and a rate of increase in the vehicle height by the rear wheel side relative position changing apparatus 140 satisfy a predetermined relationship, so as to prevent impairing the stability of travel. As an example of the predetermined relationship, it is possible to cite an ideal relationship in which the vehicle height is changed while keeping the angle between the seat 19 and the road surface in the same state as that before change in the vehicle height, when the motorcycle 1 is traveling along a smooth road surface. For example, the predetermined relationship (ideal relationship) may be a relationship according to which, if a portion of the surface of the seat 19 is parallel to the road surface, then the vehicle height is changed while maintaining the attitude of the seat 19 in such a manner that the portion of the surface of the seat 19 remains parallel to the road surface. The rate of increase in the vehicle height by the front wheel side relative position changing apparatus 240 can be regarded as the speed of movement of the supporting member 241 of the front wheel side relative position changing apparatus 240 with respect to the hydraulic jack 243, and the rate of increase in the vehicle height by the rear wheel side relative position changing apparatus 140 can be regarded as the speed of movement of the supporting member 141 of the rear wheel side relative position changing apparatus 140 with respect to the hydraulic jack 143. The switching valve control unit 57 relating to the present embodiment controls the opening and closing of the front wheel side switching valve 270 and the opening and closing of the rear wheel side switching valve 170, so as to obtain an ideal relationship between the front wheel side speed of movement which is the speed of movement of the supporting member 241 of the front wheel side relative position changing apparatus 240 with respect to the hydraulic jack 243, and the rear wheel side speed of movement which is the speed of movement of the supporting member 141 of the rear wheel side relative position changing apparatus 140 with respect to the hydraulic jack 143.

There follows a detailed description of the opening and closing control processing relating to the rear wheel side switching valve 170 and the front wheel side switching valve 270 which is carried out by the switching valve control unit 57 of the control apparatus 50.

FIG. 11 is a diagram showing an ideal relationship between the front wheel side speed of movement and the rear wheel side speed of movement. In FIG. 11, the horizontal axis represents the elapsed time after the motorcycle 1 has reached a prescribed speed and the front wheel side switching valve 270 and the rear wheel side switching valve 170 have been closed in order to change the vehicle height, and the vertical axis represents the front wheel side amount of movement Lf and the rear wheel side amount of movement Lr.

The ideal relationship shown in FIG. 11 is specified in such a manner that, when the motorcycle 1 has reached a prescribed speed and the front wheel side switching valve 270 and the rear wheel side switching valve 170 have been closed (after the vehicle height has started to rise), the ratio between the front wheel side speed of movement and the rear wheel side speed of movement, from the lowest vehicle height position until reaching the highest vehicle height position, in other words, the ratio between the front wheel side amount of movement and the rear wheel side amount of movement in any time segment during this period, becomes a prescribed value. Below, the front wheel side speed of movement and the rear wheel side speed of movement shown in FIG. 11 are respectively called the front wheel side ideal speed and the rear wheel side ideal speed.

Even if the switching valve control unit 57 controls the opening and closing of the front wheel side switching valve 270 and the opening and closing of the rear wheel side switching valve 170 in such a manner that the front wheel side speed of movement and the rear wheel side speed of movement satisfy an ideal relationship, the front wheel side speed of movement and the rear wheel side speed of movement do not necessarily satisfy the ideal relationship, due to the travel circumstances of the motorcycle 1, the state of the road surface, and the like. In this case, the switching valve control unit 57 relating to the present embodiment judges whether or not the ratio between the front wheel side amount of movement Lf and the rear wheel side amount of movement Lr (Lf/Lr) after an arbitrary time period has elapsed is at the prescribed value (or in a prescribed range centered on the prescribed value), and if the ratio is not at the prescribed value (or in a prescribed range centered on the prescribed value), then the switching valve control unit 57 implements control so as to match the faster speed of movement, to the slower speed of movement.

FIG. 12 is a diagram showing a control mode of the switching valve control unit 57 relating to the present embodiment. In FIG. 12, the front wheel side amount of movement and the rear wheel side amount of movement when the vehicle height is at the highest position are respectively termed Lft and Lrt. The ratio between these (front wheel side amount of movement Lft/rear wheel side amount of movement Lrt) is a prescribed value.

Taking the front wheel side amount of movement and the rear wheel side amount of movement when a time period of t1 has elapsed after the start of rise in the vehicle height to be Lf1 and Lr1 respectively, the switching valve control unit 57 relating to the present embodiment judges that the front wheel side movement speed is faster than the rear wheel side movement speed if the ratio (Lf1/Lr1) between the front wheel side amount of movement Lf1 and the rear wheel side amount of movement Lr1 is greater than a prescribed value (or greater than a prescribed range centered on the prescribed value). In this case, the switching valve control unit 57 opens the front wheel side switching valve 270 in order to correct the front wheel side amount of movement Lf so as to match the front wheel side speed of movement with the rear wheel side speed of movement. The switching valve control unit 57 then closes the front wheel side switching valve 270 when the ratio between the front wheel side amount of movement Lf and the rear wheel side amount of movement Lr has reached a prescribed value.

Furthermore, taking the front wheel side amount of movement and the rear wheel side amount of movement when a time period of t2 has elapsed after the start of rise in the vehicle height to be Lf2 and Lr2 respectively, the switching valve control unit 57 relating to the present embodiment judges that the rear wheel side movement speed is faster than the front wheel side movement speed if the ratio (Lf2/Lr2) between the front wheel side amount of movement Lf2 and the rear wheel side amount of movement Lr2 is smaller than a prescribed value (or smaller than a prescribed range centered on the prescribed value). In this case, the switching valve control unit 57 opens the rear wheel side switching valve 170 in order to correct the rear wheel side amount of movement so as to match the front wheel side speed of movement with the rear wheel side speed of movement. If the ratio between the front wheel side amount of movement and the rear wheel side amount of movement is at a prescribed value (or in a prescribed range centered on the prescribed value), then the rear wheel side switching valve 170 is closed.

Moreover, taking the front wheel side amount of movement and the rear wheel side amount of movement when a time period of t3 has elapsed after the start of rise in the vehicle height to be Lf3 and Lr3 respectively, the switching valve control unit 57 relating to the present embodiment judges that the front wheel side movement speed and the rear wheel side movement are the same if the ratio (Lf3/Lr3) between the front wheel side amount of movement Lf3 and the rear wheel side amount of movement Lr3 is equal to the prescribed value (or in a prescribed range centered on the prescribed value). In this case, the switching valve control unit 57 keeps the front wheel side switching valve 270 and the rear wheel side switching valve 170 closed, even if the front wheel side speed of movement and the rear wheel side speed of movement are respectively different from the front wheel side ideal speed and the rear wheel side ideal speed.

Next, the procedure of the opening and closing control processing that is performed by the switching valve control unit 57 will be described with reference to a flowchart.

FIG. 13 is a flowchart showing a procedure of opening and closing control processing that is performed by the switching valve control unit 57. The switching valve control unit 57 repeatedly executes the opening and closing control processing, each time a predetermined time interval elapses.

Firstly, the switching valve control unit 57 acquires the speed Vc of the motorcycle 1 which is stored in RAM (S1301). Thereupon, it is judged whether or not the vehicle speed Vc acquired in S1301 is equal to or greater than the reference vehicle speed Vt (S1302). Subsequently, if the vehicle speed Vc is equal to or greater than the reference vehicle speed Vt (YES in S1302), the front wheel side switching valve 270 and the rear wheel side switching valve 170 are closed (S1303), and a front/rear adjustment flag which indicates that there is a requirement to carry out front/rear adjustment processing (described hereinafter) is set to ON in the RAM (S1304). On the other hand, if the vehicle speed Vc is not equal to or greater than the reference vehicle speed Vt (NO in S1302), the front wheel side switching valve 270 and the rear wheel switching valve 170 are opened (S1305), and the front/rear adjustment flag is set to OFF in the RAM (S1306).

The front wheel speed of rotation calculation unit 51, the rear wheel speed of rotation calculation unit 52, and the vehicle speed ascertaining unit 56 respectively calculate the front wheel speed of rotation Rf, the rear wheel speed of rotation Rr and the vehicle speed Vc, and store these values in the RAM, at a cycle which is equal to or shorter than the cycle at which the switching valve control unit 57 carries out the opening and closing control processing. Furthermore, the reference vehicle speed Vt is stored previously in the ROM.

Next, the procedure of the front/rear adjustment processing that is performed by the switching valve control unit 57 will be described with reference to the flowchart.

FIG. 14 is a flowchart showing a procedure of front/rear adjustment processing that is performed by the switching valve control unit 57. The switching valve control unit 57 repeatedly executes the front/rear adjustment processing, each time a predetermined time interval elapses.

Firstly, the switching valve control unit 57 investigates whether or not the front/ear adjustment flag set in the RAM is set to ON (S1401). If the front/rear adjustment flag is ON (YES in S1401), then the front wheel side amount of movement Lf and the rear wheel side amount of movement Lr stored in the RAM are read out and acquired (S1402). It is then judged whether or not the ratio (Lf/Lr) between the front wheel side amount of movement Lf and the rear wheel side amount of movement Lr is in a prescribed range centered on the prescribed value (S1403). In other words, it is judged whether or not the ratio (Lf/Lr) between the front wheel side amount of movement Lf and the rear wheel side amount of movement Lr is no less than a lower limit value of the prescribed range and no more than an upper limit value of the prescribed range. If the ratio (Lf/Lr) between the front wheel side amount of movement Lf and the rear wheel side amount of movement Lr is in the prescribed range (YES in S1403), then it is judged whether or not the front wheel side amount of movement Lf is at the maximum value Lft and whether or not the rear wheel side amount of movement Lr is at the maximum value Lrt (S1404). If the front wheel side amount of movement Lf is at the maximum value Lft and the rear wheel side amount of movement Lr is at the maximum value Lrt (YES in S1404), then the vehicle height is at the highest position, and therefore the execution of this processing is terminated.

On the other hand, if the ratio (Lf/Lr) between the front wheel side amount of movement Lf and the rear wheel side amount of movement Lr is not at the prescribed value (NO in S1403), then it is judged whether or not the ratio (Lf/Lr) between the front wheel side amount of movement Lf and the rear wheel side amount of movement Lr is larger than the upper limit value in the prescribed range (S1405). If the ratio (Lf/Lr) between the front wheel side amount of movement Lf and the rear wheel side amount of movement Lr is larger than the upper limit value (YES in S1405), then the front wheel side switching valve 270 is opened (S1406). On the other hand, if the ratio (Lf/Lr) between the front wheel side amount of movement Lf and the rear wheel side amount of movement Lr is not larger than the upper limit value (NO in S1405), then this means that the ratio (Lf/Lr) between the front wheel side amount of movement Lf and the rear wheel side amount of movement Lr is smaller than the prescribed value, and hence the rear wheel side switching value 170 is opened (S1407). When the front wheel side switching valve 270 has been opened in S1406 and the rear wheel side switching valve 170 has been opened in S1407, the processing from S1401 onwards is executed.

The front wheel side amount of movement ascertaining unit 53 and the rear wheel side amount of movement ascertaining unit 54 respectively calculate the front wheel side amount of movement Lf and the rear wheel side amount of movement Lr at a cycle which is equal to or shorter than the cycle at which the switching valve control unit 57 carries out the front/rear adjustment processing. Furthermore, the prescribed range centered on the prescribed value described above, and the maximum value Lrt and the maximum value Lft are stored previously in the ROM.

In this way, due to the switching valve control unit 57 of the control apparatus 50 carrying out this front/rear adjustment processing, the control apparatus 50 can raise the vehicle height accurately in such a manner that the rate of increase in the vehicle height by the front wheel side relative position changing apparatus 240 and the rate of increase in the vehicle height by the rear wheel side relative position changing apparatus 140 satisfy a predetermined relationship. Consequently, it is possible to maintain the attitude of the vehicle body frame 11 (seat 19), even during the course of adjustment of the vehicle height. As a result of this, it is possible to prevent impairing the stability of travel, even when the vehicle height is adjusted.

EXPLANATION OF THE REFERENCE NUMERALS

1: motorcycle; 11: vehicle body frame; 13: front fork; 14: front wheel; 21: rear wheel; 22: rear suspension; 50: control apparatus; 56: vehicle speed ascertaining unit; 57: switching valve control unit; 110: rear wheel side suspension spring; 120: rear wheel side damper; 140: rear wheel side relative position changing apparatus; 160: rear wheel side liquid supply apparatus; 170: rear wheel side switching valve; 210: front wheel side suspension spring; 220: front wheel side damper; 240: front wheel side relative position changing apparatus; 260: front wheel side liquid supply apparatus; 270: front wheel side switching valve

What is claimed is:

1. A vehicle height adjustment apparatus, comprising:
a front wheel side changing unit capable of changing a front wheel side relative position which is a relative position of a main body of a vehicle and a front wheel thereof;
a rear wheel side changing unit capable of changing a rear wheel side relative position which is a relative position of the main body of the vehicle and a rear wheel thereof; and
a control unit for adjusting a height of the main body of the vehicle by controlling the front wheel side changing unit and the rear wheel side changing unit so as to change the front wheel side relative position and the rear wheel side relative position,
wherein the control unit controls the front wheel side changing unit and the rear wheel side changing unit in such a manner that a rate of change of the front wheel side relative position and a rate of change of the rear wheel side relative position satisfy a predetermined relationship,
the control unit starts changing of the front wheel side relative position and the rear wheel side relative position when a predetermined condition is established, and controls the front wheel side changing unit and the rear wheel side changing unit in such a manner that a ratio between an amount of change of the front wheel side relative position and an amount of change of the rear wheel side relative position during a prescribed time period after the start of changing becomes a prescribed value, and the control unit controls the front wheel side changing unit and the rear wheel side changing unit such that if the ratio is larger than an upper limit value of a range including the prescribed value, the amount of change of the front wheel side relative position is reduced, and if the ratio is lower than a lower limit value of the range, the amount of change of the rear wheel side relative position is reduced.

2. The vehicle height adjustment apparatus according to claim 1, wherein the control unit starts changing of the front wheel side relative position and the rear wheel side relative position when a speed of the vehicle has become equal to or greater than a predetermined speed.

\* \* \* \* \*